United States Patent
Proulx et al.

(10) Patent No.: US 6,928,741 B2
(45) Date of Patent: *Aug. 16, 2005

(54) FIXED LINE HEAD FOR FLEXIBLE LINE ROTARY TRIMMERS

(75) Inventors: Richard A. Proulx, Alta Loma, CA (US); Sasha Johnson, Walnut, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/736,014

(22) Filed: Dec. 15, 2003

(65) Prior Publication Data

US 2004/0128840 A1 Jul. 8, 2004

Related U.S. Application Data

(63) Continuation-in-part of application No. 10/314,674, filed on Dec. 9, 2002, now abandoned, which is a continuation-in-part of application No. 09/992,048, filed on Nov. 21, 2001, now Pat. No. 6,519,857.

(51) Int. Cl.[7] ............................................. A01D 50/00
(52) U.S. Cl. ......................................... 30/276; 30/347
(58) Field of Search .................... 30/276, 347; 56/12.7; 114/217, 219

(56) References Cited

U.S. PATENT DOCUMENTS

| | | | | |
|---|---|---|---|---|
| 3,708,967 A | * | 1/1973 | Geist et al. ................... | 56/12.7 |
| 4,062,114 A | * | 12/1977 | Luick ........................... | 30/276 |
| 4,190,954 A | * | 3/1980 | Walto ........................... | 30/347 |
| 4,301,642 A | * | 11/1981 | Thurber ....................... | 56/12.7 |
| 4,411,069 A | * | 10/1983 | Close et al. ................... | 30/276 |
| 4,453,486 A | * | 6/1984 | Harken ......................... | 114/218 |
| 4,644,655 A | * | 2/1987 | Bottamiller et al. .......... | 30/347 |
| 4,685,759 A | * | 8/1987 | Kurtz ....................... | 200/51.14 |
| 4,756,146 A | * | 7/1988 | Rouse ........................ | 56/12.7 |
| 5,433,006 A | * | 7/1995 | Taguchi ....................... | 30/276 |
| 5,758,424 A | * | 6/1998 | Iacona et al. ................ | 30/347 |
| 5,887,348 A | * | 3/1999 | Iacona et al. ................ | 30/276 |
| 6,247,539 B1 | * | 6/2001 | Jerez ........................... | 172/41 |
| 6,249,978 B1 | * | 6/2001 | Sheldon ....................... | 30/276 |
| 6,347,455 B2 | * | 2/2002 | Brant et al. ................... | 30/276 |
| 6,401,344 B1 | * | 6/2002 | Moore et al. .................. | 30/347 |
| 6,519,857 B1 | * | 2/2003 | Proulx et al. ................ | 30/276 |
| 2003/0033718 A1 | * | 2/2003 | Alliss ........................... | 30/276 |

* cited by examiner

*Primary Examiner*—Charles Goodman
(74) *Attorney, Agent, or Firm*—Holland & Knight LLP

(57) ABSTRACT

A cutting head for rotary trimmers in which at least one, and preferably two relatively short fixed lengths of flexible cutting line are inserted into opposed channels in the head and are secured in place by a pair of spring biased toothed cams. Each of the cams is pivotally mounted on a post within the housing adjacent one of the channels and defines a curvilinear camming surface having a plurality of uniformly spaced teeth thereon that project into the channels at increasing angles of inclination from the outermost tooth to the innermost tooth for engaging the line. A pair of torsion springs bias the cams to pivot on their mounting teeth such that the backsides of the teeth are continually urged toward the openings to the channels thereby allowing line to be inserted inwardly into the head past the toothed cams but retained by the cams against any outwardly directed forces acting on the line. The cams are symmetrically balanced about their axes of rotation so as to be unaffected by centrifugal force acting thereon during use.

59 Claims, 10 Drawing Sheets

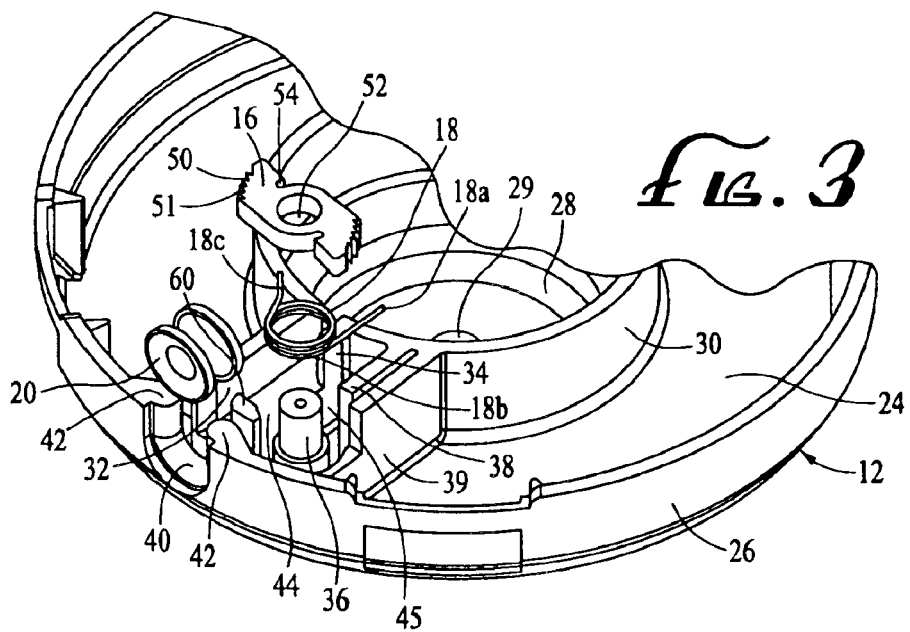
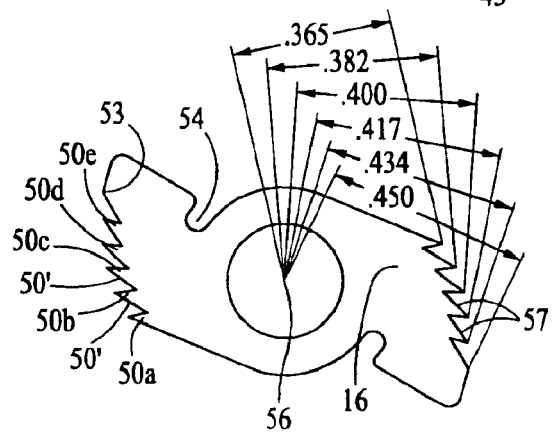
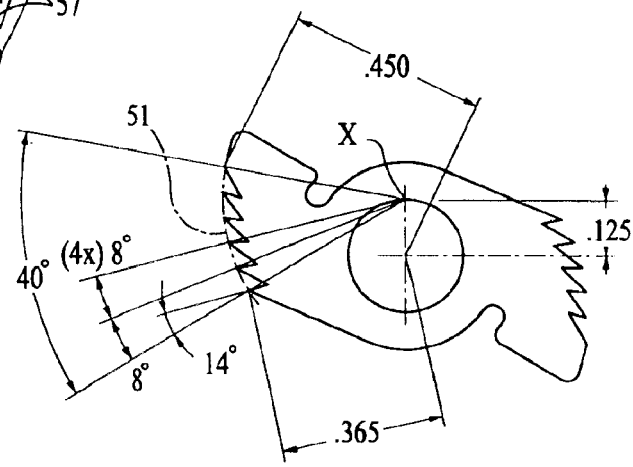

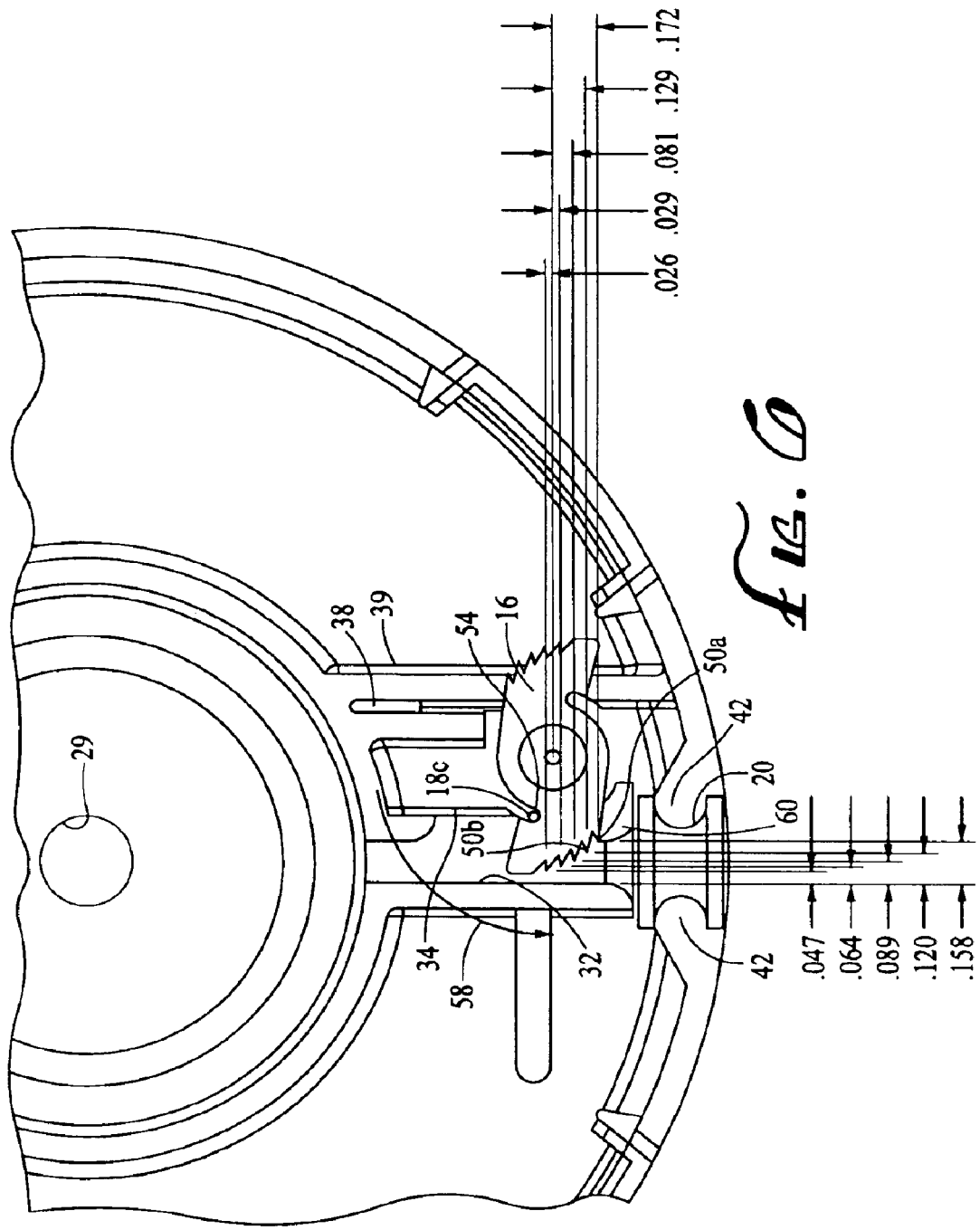

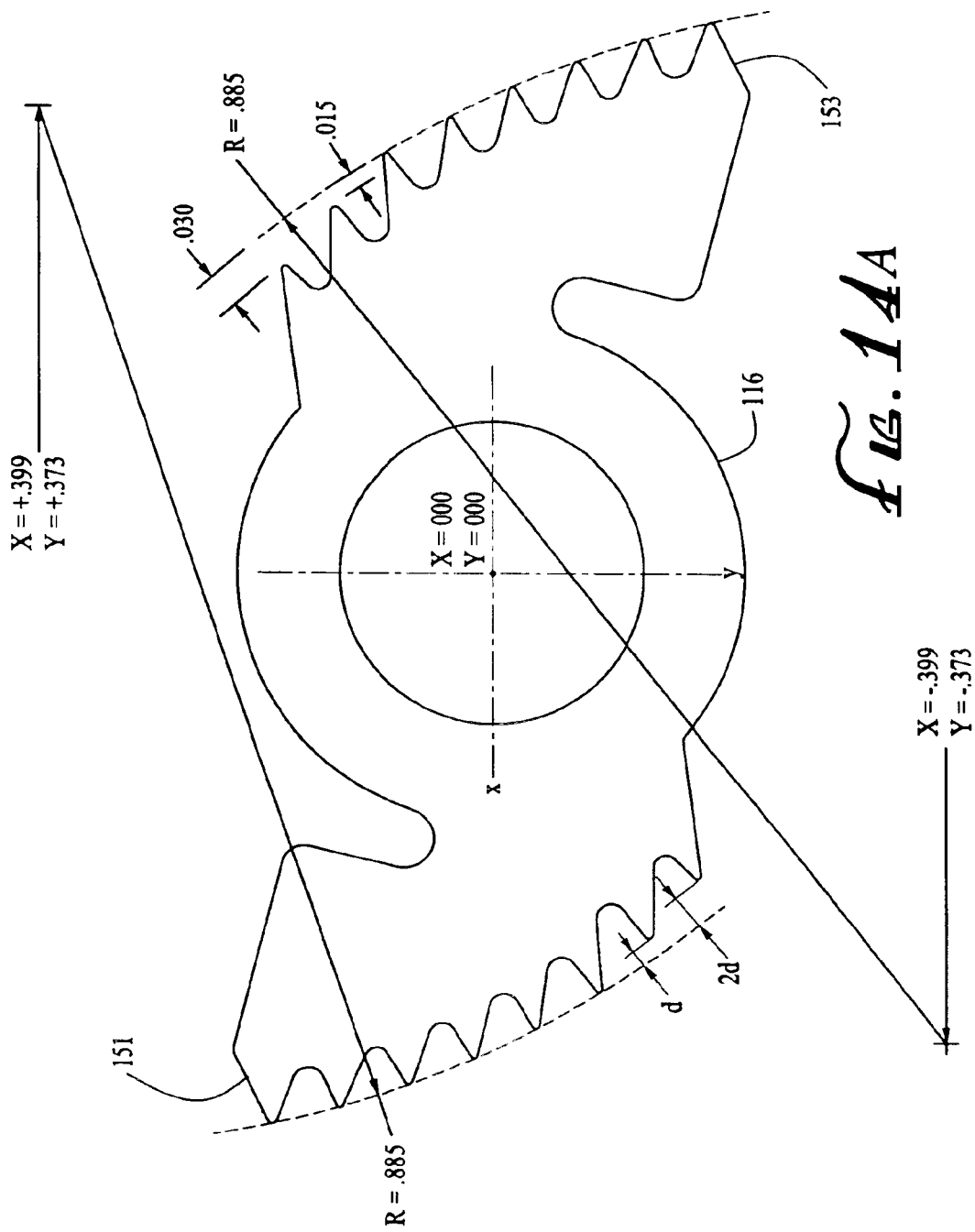

FIXED LINE HEAD FOR FLEXIBLE LINE ROTARY TRIMMERS

CROSS REFERENCE TO RELATED APPLICATIONS

This is a continuation-in-part of application Ser. No. 10/314,674 entitled "FIXED LINE HEAD FOR FLEXIBLE LINE ROTARY TRIMMERS" filed Dec. 9, 2002, now abandoned, which is a continuation-in-part of application Ser. No. 09/992,048, filed Nov. 21, 2001, now U.S. Pat. No. 6,519,857, issued on Feb. 18, 2003.

BACKGROUND OF THE INVENTION

The present invention is directed to cutting heads for use in flexible line rotary trimmers. Flexible line rotary trimmers are commonly used for cutting vegetation such as grass and weeds, particularly along walks, fences and flower beds and around trees. These devices comprise a rotary driven head that carries one or more lengths of monofilament line mounted within a housing. Extended end portions of each line project from the housings through guides in the side wall of the housing. As the head rotates at high speed, the end portions of the line are caused to project outwardly from the housing by the centrifugal forces acting thereon and function as cutting blades.

The majority of trimmer heads presently in use employ two separate monofilament lines which are wrapped about a common spool mounted within the head housing. The lines project from the spool and housing through diametrically opposed guides in the side wall of the trimmer housing. When the cutting line projecting from the head breaks or becomes overly worn, fresh line must be extended from the head and the old line severed and discarded. In what are commonly termed manual-type heads, the drive motor, which can be gas or electric, is shut down and a line indexing mechanism on the stationary head is actuated to pay out additional line from the head. This is typically accomplished by the mechanism temporarily disengaging the spool from the head and rotating the spool a predetermined amount relative to the head. By simply pulling on the cutting line, a measured length of fresh line is pulled from the spool and the old line severed and discarded. In an effort to reduce the down time for line replacement, heads commonly referred to as "bump-feed" heads were developed in which the indexing mechanism is activated while the head is still rotating. The user simply presses the rotating head against the ground depressing an actuator button on the bottom of the head which temporarily disengages the line carrying spool from the housing, allowing the spool to rotate relative to the housing. The inertia of the line and centripetal force acting on the line extending from the rapidly rotating head (often erroneously referred to as centrifugal force) causes fresh line to be pulled from the spool and extended from the housing. A metering mechanism limits the relative rotation of the spool with respect to the housing and thus limits the length of the fresh lines paid out of the head. A knife guard provided at a desired radial distance from the central axis of rotation severs the worn lines, leaving the desired lengths of fresh line projecting from the head. In an effort to further streamline the line replacement process, "automatic heads" were developed. Such heads typically include a spring biased pawl-type mechanism that reacts to an imbalance in the inwardly and outwardly directed forces acting on the rapidly rotating line that results from a loss of mass in the line extending from the head due to wear or breakage. The activation of the pawl mechanism temporarily disengages the spool from the housing allowing relative rotation therebetween and the paying out of a metered amount of line. Excess material is again automatically severed by a knife guard as with the bump-feed type head.

While this evolution of the flexible line rotary trimmers from the manual head to the automatic head has significantly reduced operator time and effort in replacing worn and broken line, these advancements have met with some resistance. Each of these types of cutting heads require the user to replace the line when the original supply has been consumed. For the casual home user this can present a problem. Depending on the particular head, generally at least two separate lines, several feet in length, must be wrapped about the spool. If this is not done properly, the line may tangle within the head, interfering with the withdrawal of fresh line and requiring disassembly of the head and rewinding of the line. The more complicated the line feed mechanism, the more critical is the proper winding of the line within the head. Proper winding is particularly important in automatic heads where the slightest tangle can interfere with the functioning of the line pay out mechanism. Thus, there remains a need for a flexible line rotary trimmer head which greatly simplifies the task of line replacement for the home user.

Several attempts have been made to provide a more user-friendly rotary cutting head. Such heads typically employ one or more short lengths of a line which are anchored within the head in lieu of the longer lengths of line wrapped about an interior spool. These heads are frequently referred to as fixed line cutting heads. While fixed line cutting heads have eliminated the need to carefully wrap the line about the spools to prevent tangles, many such heads still require disassembly to replace worn or broken line. A fixed line head which does not require disassembly to effect line replacement is found in U.S. Pat. No. 4,062,114, issued to Luick and entitled "VEGETATION CUTTING APPARATUS." The cutting heads disclosed therein are provided with one of several differently configured channels terminating in a reduced diameter portion proximate the side wall of the head. A short length of flexible cutting line extends through the channel and extends radially from the head. The line is held in place by an enlarged member secured to the inner end of the length of cutting line which is translatable along the channel but cannot pass through the reduced diameter portion thereof. While such a head and line configuration provides for relatively simple line replacement, each length of replacement line must be provided with a suitable enlarged member at one end thereof, significantly increasing the cost of operation. In addition, if the cutting line were to break at the eyelet or outlet end of the line channel, line removal may be difficult.

Other attempts to provide a fixed line cutting head in which the line can be easily and quickly replaced are found in U.S. Pat. Nos. 5,758,424 and 5,887,348, both issued to Fernando and Ignazio Iacona and entitled "HEAD FOR STRING TRIMMER." U.S. Pat. No. 5,758,424 discloses a trimmer head in which a pair of opposed lengths of cutting line are inserted into the head adjacent spring biased cams. The springs cause the cams to press against the line with sufficient force to hold the line in place when the head is at rest. To provide a greater line securement force during use, the cams are configured such that their centers of gravity are located between the posts on which they are mounted and an opposed wall against which they press the respective lengths of cutting line. The centrifugal force acting on the cams during the rapid rotation of the cutting head causes the cams to pivot outwardly and press tightly against the lengths of cutting line to secure the line to the head during use. While such a head facilitates line replacement in that it allows fresh lengths of replacement line to simply be inserted into the head through opposed openings therein and be held in place by the spring biased cams, the Iacona head is dependent on rotational velocity for the tight securement of the cutting line. Accordingly, when such a head is used in heavy brush, the drag on the line will cause the rotational speed of the head to drop, decreasing the centrifugal force acting on the cams and thus the gripping forces of the cams against the lengths of line. As a result, the line could be pulled from the head by the brush, rendering the head ill-suited for use in heavy brush.

U.S. Pat. No. 5,887,348 discloses a fixed line head which utilizes a spring-biased mechanism to hold the line in place with a constant gripping force. The mechanism, however, extends through the top of the head housing so that it can be manipulated by the user when the head is at rest to release and secure the line. The extension of the securement mechanism beyond the surface of the head renders the mechanism susceptible to becoming entangled during use which would tend to pull the mechanism outwardly from the head and possibly release the cutting line at a relatively high velocity. Thus, while this embodiment of a fixed line head is not dependent on rotational velocity for its gripping force, it also is ill-suited for use in heavy brush.

It would be desirable to provide a cutting head for flexible line trimmers that retains the ease of line removal and replacement exhibited by the Iacona fixed line cutting heads, but is neither reliant on rotational velocity for line securement nor susceptible to the inadvertent release of the cutting line during use under the severest of cutting conditions. The fixed line cutting head of the present invention obtains these results.

SUMMARY OF THE INVENTION

Briefly, the present invention comprises a fixed line head for flexible line rotary trimmers in which one or more and preferably two relatively short fixed lengths of cutting line are inserted into opposed channels in the head through diametrically opposed openings in the side wall of the trimmer head housing and are secured in place by a pair of spring biased toothed cams. Each of the cams is pivotally mounted on a post within the housing adjacent one of the channels and defines a curvilinear camming surface. The cam teeth are disposed along and project from the curved cam surface into one of the channels at varying inward inclinations toward a radially extending support wall on the opposite side of the channel. A pair of torsion springs bias the cams to pivot on their mounting posts such that the backsides of the teeth are continually urged toward the openings to the channels.

As line is inserted into the proposed head, it passes along the channels between the support wall and one of the cams and abuts the backside of one or more of the cam teeth. As line is pushed further into the housing, it pushes against the cam teeth and causes the cam to pivot against the force of the spring and away from the line, allowing the line to be inserted between the wall and cam. The two lengths of line are pushed into the head until the inner ends emerge through openings in the bottom of the head. The line is then released. When the head is at rest, the line is held in place by the springs urging the backsides and tips of several of the cam teeth against the line, pressing the line against one of the support walls. If one were to pull outwardly on the line, the inclined cam teeth will snag the line and tend to pivot the cam in the direction of the spring force. However, as the cams pivot outwardly, the lengths of line are pressed against the support walls, preventing further pivoting of the cams. As a result, the cam teeth will dig into the line and prevent its withdrawal. Thus, when centrifugal force pulls on the extended line during use, the tooth cams act like ratchets and prevent withdrawal of the line. As the cams allow for inward movement of the line, worn or broken line is simply removed by grasping the inner ends of the line exposed in the openings in the bottom of the head and pulling the line through the head. Replacement line is then simply inserted through the openings in the side wall of the head.

It is therefore the principal object of the present invention to provide a cutting head for flexible line rotary trimmers that simplifies line removal and replacement while providing a tight securement of the line to the head independent of the rotational velocity of the head.

It is another object of the present invention to provide a cutting head for flexible line rotary trimmers that simplifies line removal and replacement which is of simple construction and economical to manufacture.

It is still another object of the present invention to provide a cutting head for flexible line trimmers that simplifies line removal and replacement and is adapted for use in heavy brush.

It is a further object of the present invention to provide a cutting head for flexible line rotary trimmers that simplifies line removal and replacement while providing a tight securement of the line to the head independent of the rotational velocity of the head and is adaptable for use with cutting line of varying diameters.

It is yet another object of the present invention to provide a cutting head for flexible line rotary trimmers that simplifies line removal and replacement without the need for any disassembly.

These and other objects and advantages of the present invention will become readily apparent from the following detailed description taken in conjunction with the accompanying drawings.

BRIEF DESCRIPTION OF THE DRAWINGS

FIG. 3 is a partial exploded view of the head housing, one of the line securement cams and associated torsion spring and line guide.

FIGS. 4a and 4b are enlarged plan views of one of the toothed cams of the present invention illustrating various dimensional parameters thereof.

FIG. 6 is an enlarged partial bottom plan view of the housing illustrating various dimensional parameters of the cam teeth and of the positioning of the cam teeth relative to the housing channel wall.

FIGS. 14A and 14B are enlarged plan views of another embodiment of the toothed cams of the present invention illustrating various dimensional parameters thereof.

DETAILED DESCRIPTION OF THE PREFERRED EMBODIMENT

Figure 1:
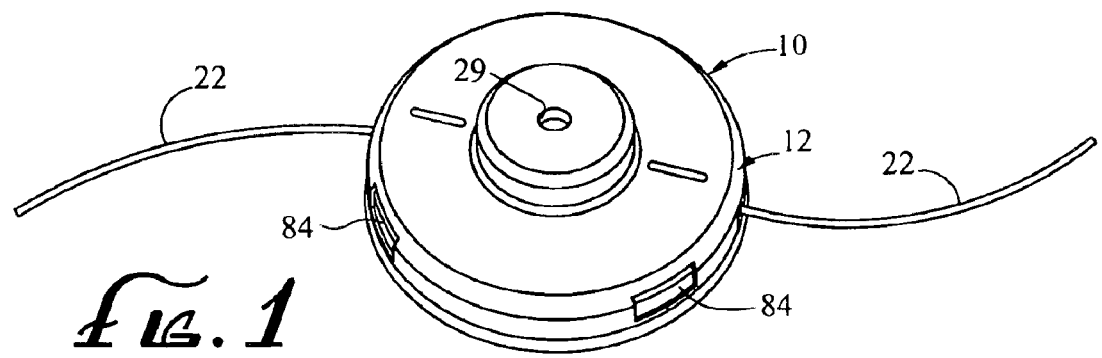
FIG. 1 is a perspective view of the cutting head of the present invention.

Referring now in detail to the drawings, the cutting head 10 of the present invention is adapted to be secured to the threaded lower end of a rotatable drive shaft on a gasoline or electric powered rotary trimmer (not shown). The head 10 comprises a housing 12, a cover 14, and preferably pairs of opposed toothed cams 16, torsion springs 18 and line guides 20 for releasably securing within the head 10 a pair of opposed lengths 22 of monofilament nylon cutting line. While in the preferred configuration of the present invention two opposed cams 16, springs 18 and line guides 20 are employed for releasably securing within the head a pair of opposed lengths of line, it is to be understood that the head could be configured so as to have a single cam, spring and line guide for the securement of a single length of monofilament nylon cutting line. Alternatively, more than two pairs of such elements could be employed to releasably secure a corresponding number of lengths of cutting line. In such multiple line configurations, the elements would be spaced within the housing such that the cutting lines would be equiangularly disposed about the head to maintain a proper balance of the head during use. The following description of the present invention, however, will be with reference to a two-line head configuration.

Figure 7:
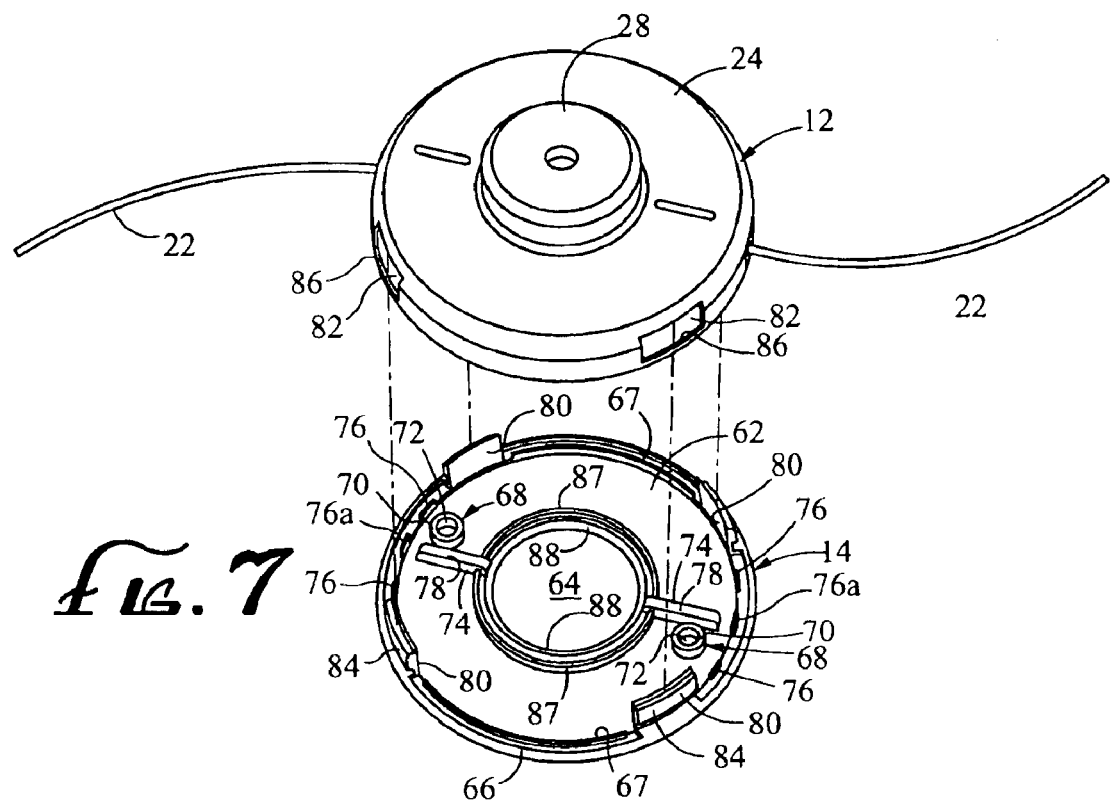
FIG. 7 is an exploded view of the housing and bottom cover of the cutting head of the present invention.
Figure 8:
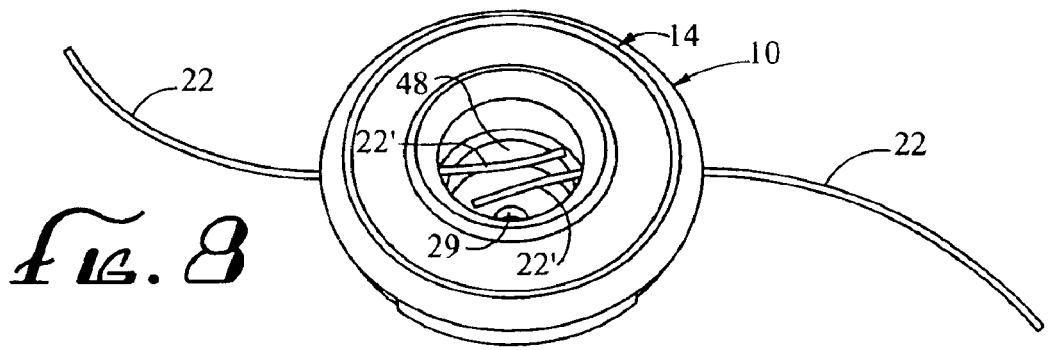
FIG. 8 is a bottom plan view of the cutting head of the present invention illustrating the exposure of the inner ends of the cutting line for line removal.
Figure 2:
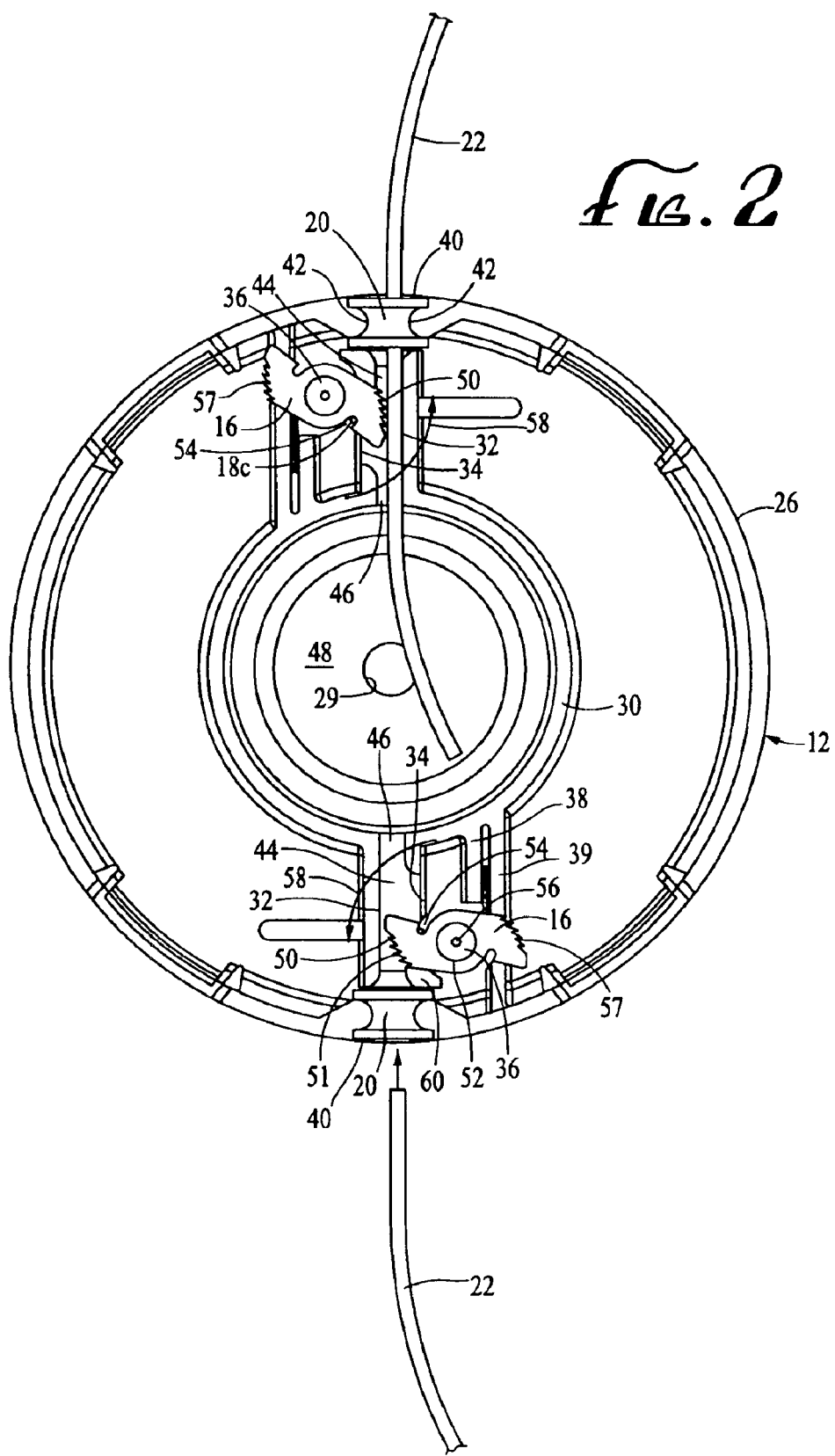
FIG. 2 is a bottom plan view of the cutting head of the present invention with the bottom cover removed to illustrate the head housing and components contained therein.
Figure 5:
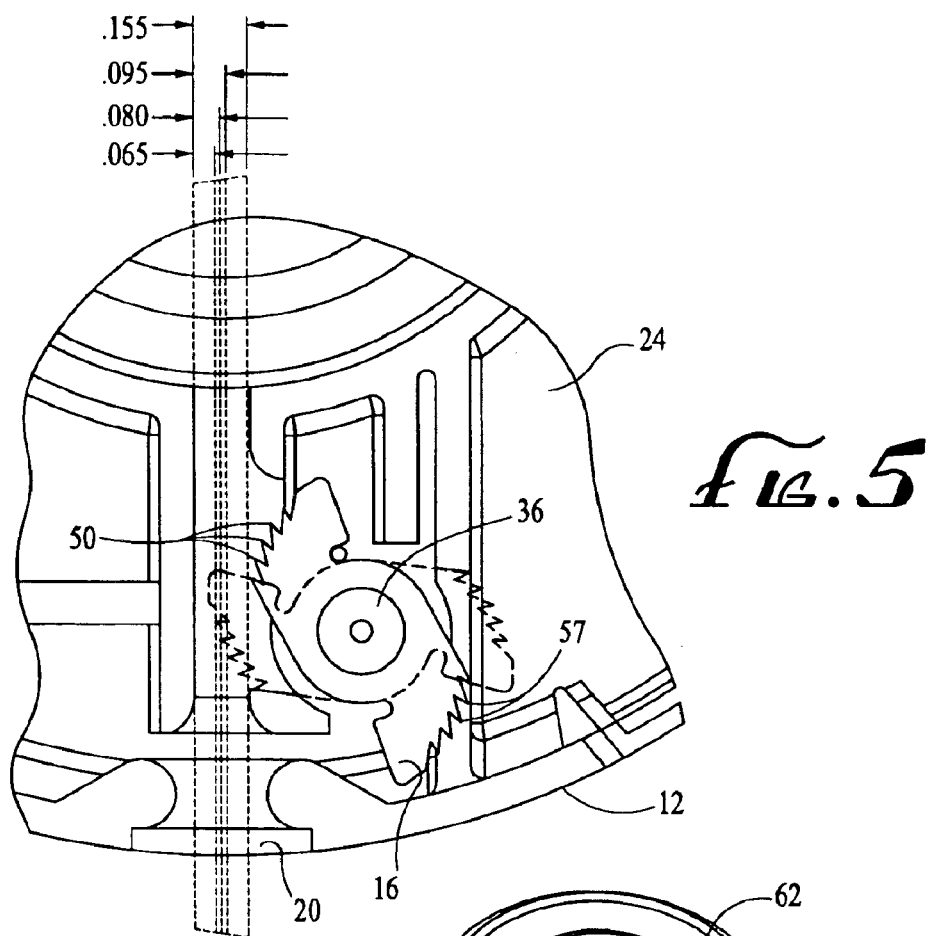
FIG. 5 is a partial plan view of the cutting head of the present invention illustrating positioning of a line engagement cam against a length of maximum diameter cutting line and showing the relative positioning of the other common diameter lines usable in the head.

The housing 12 and cover 14 are both preferably of single-piece construction and formed by injection molding glass reinforced nylon such as nylon 6 with 33% glass fill. As seen in FIG. 1, the housing 12 is secured to and disposed above cover 14. However, in the other figures, the housing 12 is shown in an inverted disposition to illustrate its interior configuration and the components of the head 10 contained within the housing. To avoid any ambiguity, references herein to directions and the relative positioning of component parts (e.g., upper, lower, above, left and right) will be made according to the directions and positioning as seen in FIGS. 2 and 3. As seen therein, the housing 12 defines a lower annular base or wall portion 24 terminating at its outer end in a cylindrical upstanding perimeter wall portion 26 and at its inner end in an axially projecting cylindrical knob portion 28. It is to be understood however, that in actual use, wall portion 24 will define the upper surface of the head 10 and knob portion 28 will project upwardly as shown in FIGS. 1 and 7. The knob portion 28 has a centrally disposed aperture 29 therein that receives the threaded end portion of the trimmer drive shaft for the attachment of the head to the shaft by means of a washer and threaded bolt (not shown). Housing 12 also defines an interior upstanding cylindrical wall portion 30 inwardly spaced from the perimeter wall portion 26, and generally opposed pairs of channel walls 32 and 34, cam mounting posts 36 and spring retention walls 38 and 39.

The perimeter wall portion 26 of the cutting head housing 12 has two diametrically opposed slots 40 formed therein adapted to receive and retain a pair of conventional line guides 20. The perimeter wall portion 26 also defines a pair of inwardly inclined guide retention walls 42 laterally adjacent each of slots 40 that allow the guides 20 to be readily inserted into their respective slots and retain the guides in opposed alignment as seen in FIG. 2. The opposed pairs of channel walls 32 and 34 in the housing define a pair of opposed radial channels 44 for receiving the lengths 22 of cutting line through the openings in guides 22. Channel walls 32 define support walls for securing the cutting line, as will be described. Channel walls 34 each define a cut out area 45 in the upper portion thereof such that one of the line securement cams 16 can project therethrough into channel 44. For the reasons to be explained, the inner cylindrical wall 30 in housing 12 also defines a pair of openings 46 therein at the end of channels 44 so that the lengths 22 of nylon cutting line can be inserted through guides 20, into and through channels 44 and openings 46 into a central interior area 48 of the housing accessible from the exterior of the housing.

The line securement cams 16 are pivotally mounted on posts 36 adjacent channels 44. Each cam defines a plurality of pointed line engagement teeth 50 disposed along a curvilinear end surface 51, a centrally disposed aperture 52 sized to receive one of the mounting posts 36 and a spring arm retention channel 54. The cams are preferably die cast from a zinc material and are configured so as to be symmetrically balanced about the central vertical axes 56 of apertures 52 (i.e., their axes of rotation) so that the cams will be unaffected by centripetal or centrifugal force during use. The cams 16 are also preferably symmetrical in configuration so as to provide the cams with an additional set of line engagement teeth 57 which allows the cams to be turned over and reversed in the event one or more of the engaging teeth 50 becomes broken or dulled.

The torsion springs 18 each define a horizontal leg portion 18a, a coil portion 18b and a vertical leg portion 18c. The springs 18 are mounted on the cam pivot posts 49 such that the horizontal leg 18a of each spring is disposed between the parallel spring retention walls 38 and 39 and the vertical leg portion 18c projects upwardly into the channel 54 in the cam 16 as seen in FIGS. 2 and 3. To facilitate assembly, the leg portions 18c are sized to project slightly above the upper flat surface of the cam. Each torsion spring 18 biases one of the cams 16 in the direction of arrows 58 in FIG. 2 such that the backsides 50' of cam teeth 50 are urged toward the line guides 20 at the openings to their respective channels 44. Springs 18 each exert about 0.5 in. lbs. of force at their fully open position which is illustrated in FIG. 6. A stop 60 is provided in housing 12 adjacent each of the line guides 20 and cams 16 to limit the pivotal movement of the cams in the direction of arrows 58.

To accommodate and secure the lengths 22 of cutting line in place, the curvilinear end surfaces 51 on cams 16 are each preferably provided with at least five pointed teeth 50a–50e, each tooth being spaced from an adjacent tooth or teeth by about 8° as illustrated in FIG. 4b and configured such that the backside (outwardly facing surface) of the outermost tooth 50a in each cam abuts one of the stops 60, positioning the cam with respect to the adjacent channel wall 32 such that the backside of the second tooth 50b is perpendicular to or slightly inclined inwardly with respect to the surface of channel wall 32 as illustrated in FIG. 6. The backsides or outwardly facing surfaces of each of the remaining teeth are also inclined inwardly with respect to the surface of wall 32 at slightly increasing angles from tooth 50c to 50e. As a result, when lengths 22 of cutting line are inserted into channels, the line will abut the backside or sides of one or more teeth (depending on the size of the line) and cause the cam 16 to pivot in the direction opposite that of arrow 58 (FIG. 2), allowing the length of cutting line to pass between the cam 16 and the opposed channel wall 32.

Figure 9:
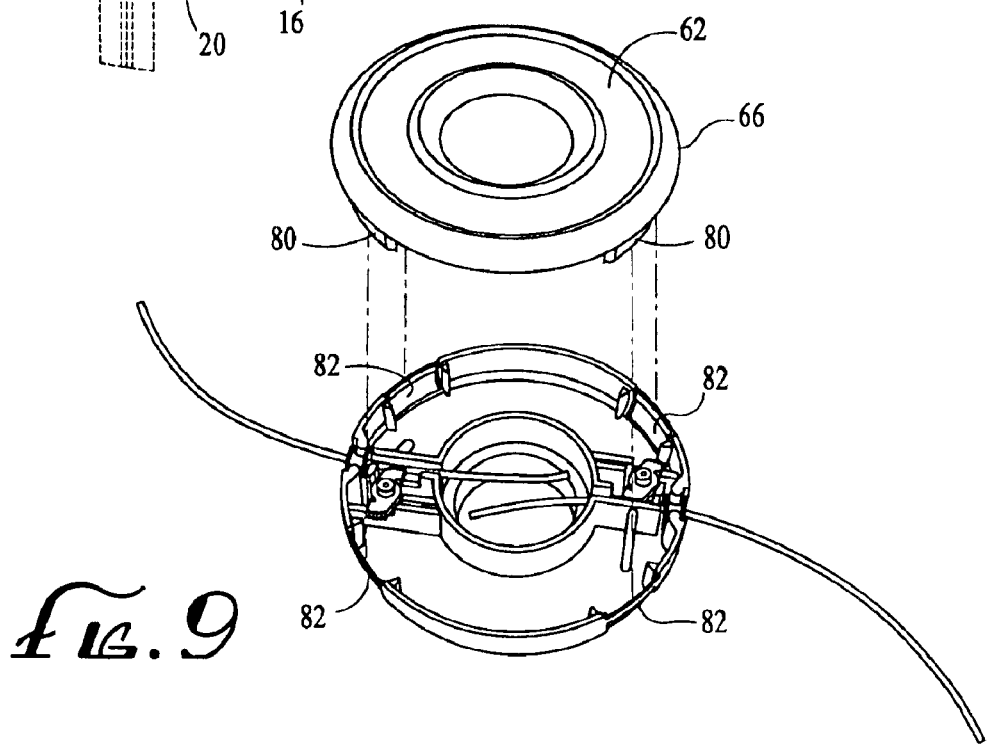
FIG. 9 is an exploded view of the housing and bottom cover of the cutting head of the present invention as seen from the underside thereof.

The lower cover 14, best seen in FIGS. 7 and 9, defines an annular lower surface 62, disposed about a central opening 64 and terminating at its outer edge in an outwardly inclined flange portion 66. A pair of annular projections 68 are provided on the interior of surface 62 to maintain the proper alignment of the line engagement cams 16 on mounting posts 36. Projections 68 each define an annular end surface 70 and a cylindrical channel 72 adapted to receive the portions of the mounting posts projecting through cams 16 such that when the cover 14 is in place on head 12, posts 36 extend into channels 36 and the end surfaces 70 of the projections 68 abut against the flat portions of the cams adjacent posts 36. Cover 14 also defines pair of aligned axially projecting and radially extending wall portions 74 adjacent annular projections 68 and a pair of smaller projections 76a radially spaced from wall portions 74 such that when the cover 14 is secured to the underside of the housing 14, the upper surfaces 78 (as shown in FIG. 7) will extend along and form bottom wall surfaces for channels 44 to ensure the passage of cutting line through channels 44 into central area 48, while projections 76a bear against and secure the line guides 20 in place.

Figure 11:
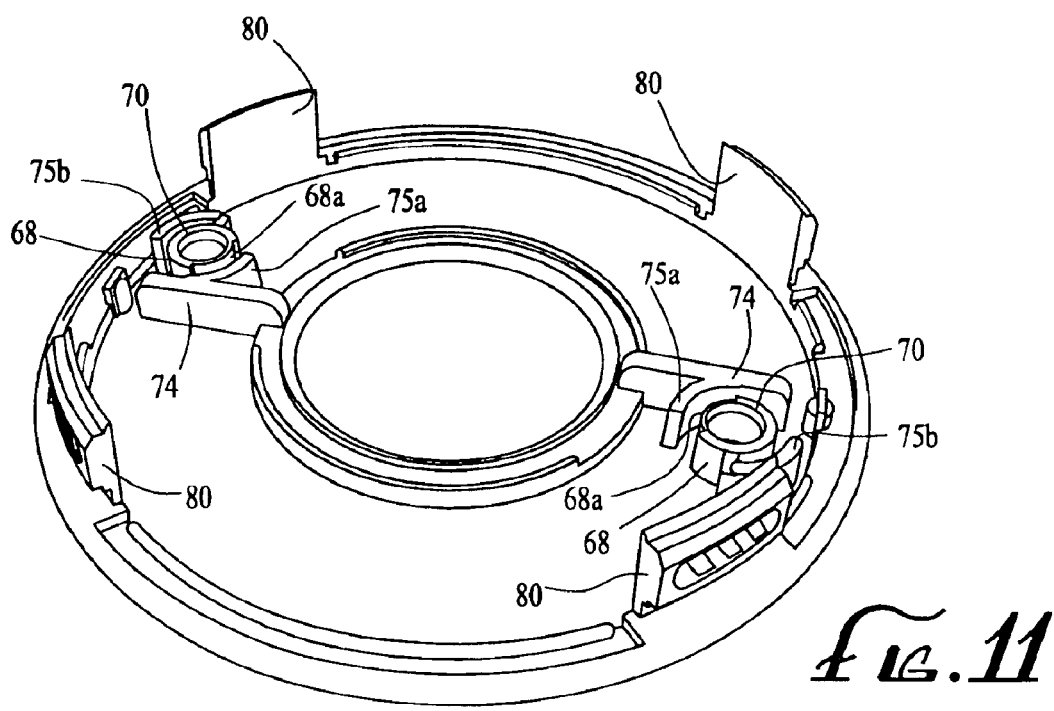
FIG. 11 is a partial plan view of a second embodiment of the bottom cover of the cutting head.

In an improved second embodiment, the lower cover 14 is additionally provided with arcuate walls 75a and 75b disposed on opposite sides of the annular projections 68 with walls 75a merging into wall portion 74 and arcuate walls 75b being connected to projection 68 via webs 77 as seen in FIG. 11. The upper surfaces of arcuate walls 75a and 75b are coplanar with the end surfaces 70 of projections 68 and thus bear against and help maintain the cams 16 in a horizontal disposition within head 10. Small arcuate relief areas 68a are provided in interior facing surfaces of projections 68 to accommodate the vertical leg portions 18c of torsion springs 18.

To secure the lower cover 14 to the housing 12, the cover is provided with a plurality of axially extending resilient locking tabs 80 that are adapted to be received in openings 82 formed in the perimeter wall 26 of housing 12. Tabs 80 are each provided with an outwardly projecting tapered portion 84, as seen in FIG. 9, so that when the housing and cover are urged together, the resilient tabs will deflect inwardly until the outwardly projecting tapered portions 84 clear the edge portions 86 adjacent openings 82 in perimeter wall 26 and snap outwardly through the openings, securing the cover to the head.

To prevent debris from entering the interior of the cutting head 10, the outer and inner perimeter portions of the cover and head are configured for a sealing engagement. The outer perimeter of the lower cover 14 is provided with a pair of opposed raised arcuate rib portions 67 and opposed pairs of arcuate projections 76 which are spaced from the guide retention projections 76a and locking tabs 80. The inner perimeter portion of the cover is provided with a pair of radially spaced upstanding annular ribs 87 and 88 disposed about the central opening 64. Upon the securement of cover 14 to the housing 12, the extended end portion of the inner cylindrical wall 30 on housing 12 projects into the annular space between inner walls 87 and 88 on the cover to seal the inner perimeter of the head. Ribs 67 and projections 76 on the outer perimeter of the cover 14 extend into the interior of the housings 12 adjacent the inner surface of the perimeter wall portion 26 of the housing. The spacings between projections 76, guide retention projections 76a and tabs 80 accommodate the guide retention walls 42 and structural elements on the housing so as to effectively seal the outer perimeter portion of the head. It should also be noted that the inclined flange portion 66 extending about the perimeter of the lower cover 14 provides an increased material thickness about the perimeter of the cover to define a protective wear ring for the head 10.

The cutting head 10 of the present invention is designed to accommodate monofilament cutting line having diameters within the range of 0.080 inches to and including 0.155 inches. In the cam configuration illustrated in FIGS. 1–11, the curvilinear surface 51 on which the line engagement teeth 50a–50e are formed traces an arc which defines a constant radius of 0.412 inches about a point X located 0.125 inches inwardly of pivot axis 56 as illustrated in FIG. 4b. The distance from the central pivot axis 56 of each cam, which coincides with the central axis of each cam pivot post 49, to wall 32 is about 0.487 inches. The spacings between wall 32 to the tips of teeth 50a–50e are also illustrated in FIG. 6. Cams 16 also preferably define a blunted tooth 53 inwardly adjacent tooth 50e and spaced therefrom at an angle of about 8°. The addition of blunted tooth 53 prevents tooth 50e from peeling the smallest diameter line (0.080 in.) when such line is used in head 10 and subjected to relatively strong outwardly directed forces. Tooth 53 achieves this result by simply obstructing the path of the peeled material, resulting in a secure grip on the small diameter line.

Figure 10:
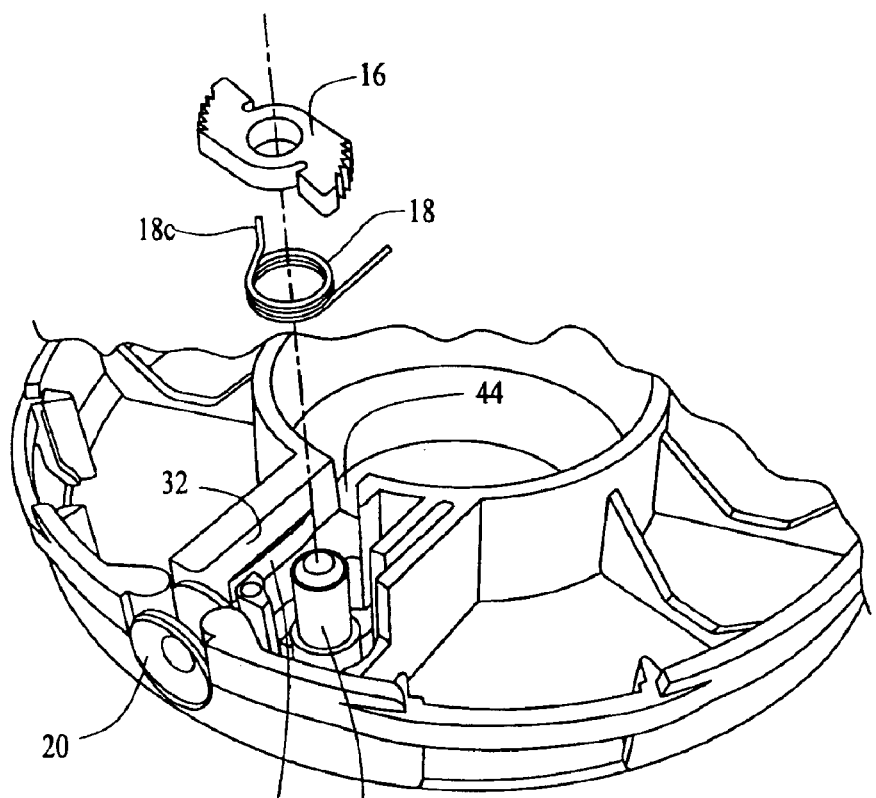
FIG. 10 is a partial exploded bottom plan view of a second embodiment of the housing illustrating a convex channel wall against which the cutting line is pressed by the cam teeth.

In the second embodiment of the head 10, the lower half of the central portion of each of the support walls 32 is convexly configured, as seen in FIG. 10. This causes the surfaces 32a of the central portion of support walls 32, i.e. that portion against which the teeth 50 on the cams 16 press the adjacent lengths 22 of cutting line, to project transversely into the channels 44 toward the cams. The extent of the projection of surfaces 32a into channels 44 is only about 0.015 in. at the midpoint of surfaces 32a. As a result, the angle at which the teeth 50 engage the line is more acute, facilitating removal of worn or damaged line in the manner to be described. This change in the attack angle of teeth is particularly significant when the head 10 is used with small diameter line, such as 0.080 in. cutting line.

The above-recited dimensions provide a cutting head 10 particularly suited for use with those line sizes most typically used in gasoline powered trimmers. The present invention, however, is readily adaptable for use with the smaller line sizes employed on electrically powered trimmers. To accommodate the lighter line, the mounting posts 36 could simply be moved closer to the line supporting walls 32. In addition, the head 10 would be reduced in size from about 5 in. in diameter to about 4 in. or as small as about 3 in.

To secure a length 22 of cutting line in head 10, one simply inserts the line through one of the line guides 20 into channel 44. As the line passes through channel 44, it pushes against the backside of one or more of the cam teeth 50 causing the cam 16 to pivot against the force of spring 18. The length of cutting line is pushed into the head until the inner end 22' thereof passes through the opening 46 in the inner cylindrical wall 30 in the head housing and into the interior area 48 of the housing. The length of line is then released. A similar length 22 of cutting line is then inserted into the opposed channel 44 in the cutting head 10. When the head is at rest, the two lengths of line are held in place by the torsion springs 18 urging the backsides and tips of one or more of the cam teeth against the line, pressing the lengths of line against the channel walls 32. If one were to pull outwardly on the lengths of line, the particular cam tooth or teeth engaging the line will snag the line and tend to pivot the cam in the direction of the spring force indicated by arrows 58, pressing the line against adjacent channel wall 32 and preventing further pivotal movement of the cam. Continued pulling on the line causes the cam teeth 50 to dig into the line and prevent its withdrawal. Thus, when the inertia and centripetal force pull on the lengths 22 of cutting line extending from the rapidly rotating head during use, the toothed cams 16 will hold the lengths of line in place. In the event the line encounters heavy brush, slowing the rotation of the head, the cams will continue to prevent withdrawal of the line as the cams are unaffected by the rotational speed of the head. However, due to the inward inclination of the cam teeth 50 relative to the longitudinal axis of channels 44, cams 16 do allow for the inward movement of the line. Accordingly, when the extended line becomes overly worn or broken, the inner end portions 22' of the lengths of line are exposed in the central area 48 of the head and can be readily grasped by the user through the central opening 64 in the lower cover 14 so that the lines can be easily pulled inwardly through and from the head. Replacement line is then simply inserted through the openings in the guides 20 in the manner above described.

FIGS. 12–15 illustrate a third embodiment of the invention which differs from the previous embodiments in that the curvilinear surfaces 32a of the central portion of the support walls against which the cam teeth press the adjacent lengths of cutting line in the second embodiment are replaced with more durable stainless steel shims 100, the configuration of the teeth on the line securement cams have been changed both in number and angular orientation to better secure the line and venting apertures 200 have been added to the upper portion of the housing to prevent the creation of a pressure drop adjacent the bottom of the head which could otherwise make uniform cutting of vegetation more difficult.

While extending the central portion 32a of the line support walls 32 into channels 44, as shown in FIG. 11, facilitates removal of worn or damaged line, it has been found that wall surface 32a is subject to wear, particularly when the trimmer head is used with lengths of cutting line having edged surfaces. As a result, the support walls can become scored, reducing their effectiveness in facilitating withdrawal of worn or damaged line. The use of stainless steel shims 100 provides the same line removal benefits as convex wall surfaces 32a by reducing the distance between the support wall and the cam teeth and provides each of the support walls with a resistant surface to obviate the problem of scoring.

Figure 12:
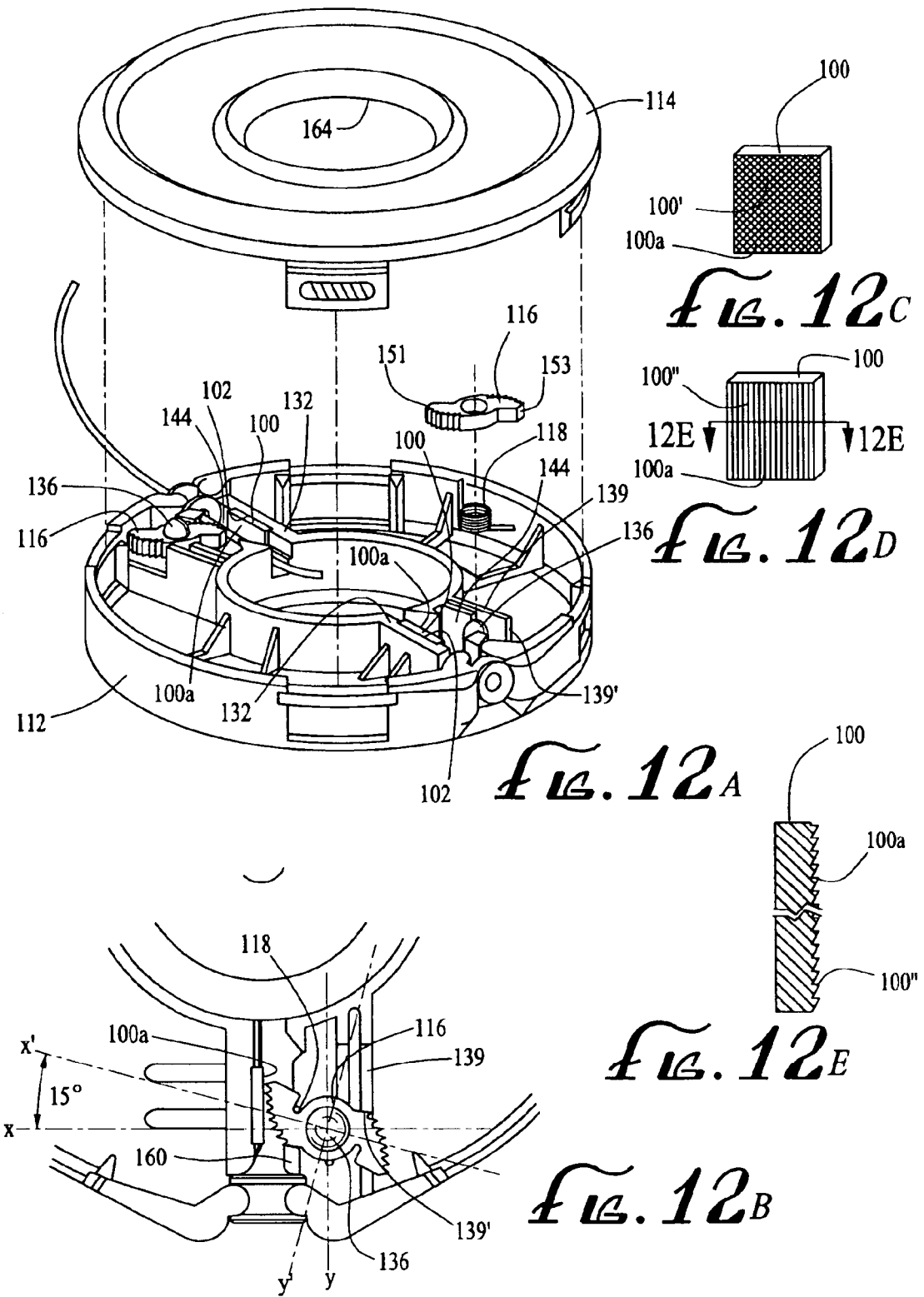
FIG. 12A is an exploded view of the housing and bottom cover of another embodiment of the cutting head of the present invention.
FIG. 12B is an enlarged partial plan view showing the orientation of the cam in the embodiment of the invention illustrated in FIG. 12A.
FIG. 12C is an enlarged perspective view of a metal shim having a knurled surface for use in providing a channel wall with a roughened wear resistant surface.
FIG. 12D is an enlarged perspective view of a metal shim having a ridged surface for use in providing a channel wall with a roughened wear resistant surface.
FIG. 12E is a section view taken along the line 12E—12E in FIG. 12D.
Figure 13:
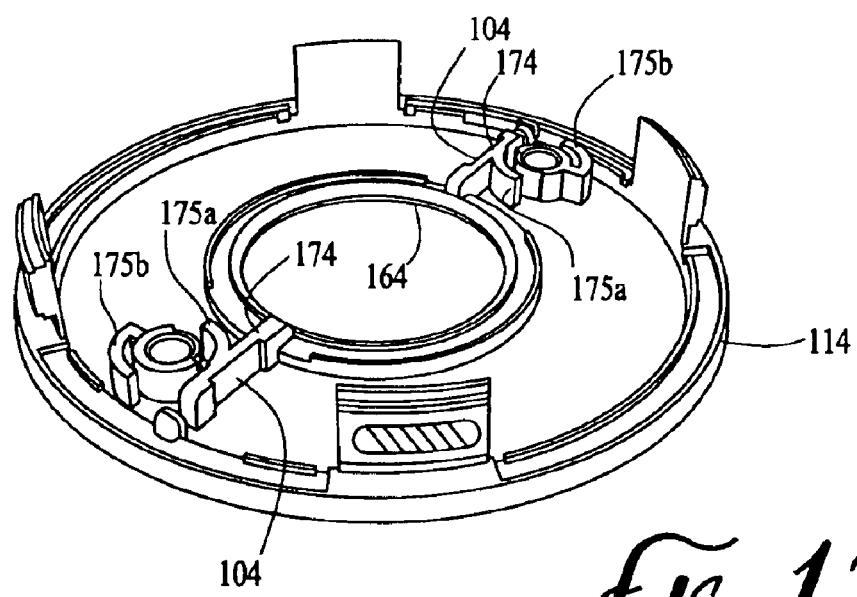
FIG. 13 is a partial plan view of the bottom cover of the cutting head illustrated in FIG. 12.

The stainless steel shims 100 can be provided in recessed areas 102 formed in the lower portions of the support walls 132 as seen in FIG. 12. The shims 100 are preferably square in shape to facilitate handling and sized so as to fit snugly within the recesses 102 such that when the injection molded glass reinforced nylon housing cools during fabrication, the material will shrink fit against the shim so as to physically secure the shim in place. So secured, for the cam size illustrated in FIG. 4b, the inner surfaces 100a of the shims are preferably each spaced a distance of about 0.414 in. from the central axes of the cam mounting posts 136. Suitably sized recessed areas 104 can be provided, if necessary, in the sides of walls 174 in the lower cover 114 to accommodate any protrusion of the shims from the upper portion of the housing support walls 132 as illustrated in FIG. 13. Other means of providing a durable, wear-resistant inner surface for the line support walls 132 could, of course, be employed.

It has also been found that when the individual lengths of replacement line are cut in the field, as opposed to using precut line, they are sometimes cut too long and can become wrapped about the knife guard (not shown) on the trimmer during start-up and pulled from the cutting head. This is believed to result, at least in part, due to the steeper angle at which the cam teeth engage the line to facilitate removal of worn or damaged line. To prevent line from being unintentionally pulled from the head and retain the line removal benefits of the stainless steel shims 100, a new cam configuration having two opposed sets of somewhat differently configured and oriented teeth is provided.

As seen in FIG. 14, cam 116, like cam 16 of the prior embodiments, are symmetrical about their central axis and defines two opposed end surfaces 151 and 153 from which the two sets of line engagement teeth project. Due to the symmetry of the cam 116, the configuration of the line engaging teeth will be described solely with respect to the first plurality of teeth 150a–150h which are shown in the operative position projecting into channels 144 adjacent line support walls 132. In cam 116, like cam 16, the two opposed pluralities of line engaging teeth are identical except that they project in opposite directions from the central axes of the cams and the second plurality of teeth 157a–157h is rotated 180° with respect to the first plurality about a horizontal X axis extending through the central axis of the cam 116. Being symmetrical, cam 116 also is reversible so that when the operatively positioned teeth 150a–150h become damaged or worn, the cam 116 can be removed from its mounting post 136, rotated 180° about the central axis of the post and re-secured onto the post, whereupon the second plurality of teeth 157a–157h will be disposed in the operative position for engaging a length of cutting line.

It should be noted that the viability of the second plurality of teeth could be maintained in both cams 16 and 116 if the second plurality of teeth were not rotated about the X axis as above-described, whereupon the cams would define a generally "W"-shaped configuration. In such a case, the second plurality of teeth could be moved to the operative position in channel 44 or 144 simply by removing the cam from its mounting post and turning the cam over about the post, i.e., rotating the cam 180° about an axis Y that is perpendicular both to the central axis of the mounting post and the horizontal X axis.

The line engagement teeth on cam 116 are slightly elongated as compared to the teeth on cam 16 and unlike the teeth on cam 16, not all of the teeth on cam 116 lie on a common curvilinear surface. In addition, while the teeth on cam 116 generally project from the outermost tooth to the innermost tooth at increasing angles of inclination with respect to the support walls 132, not every tooth follows this pattern as will be described.

Figure 14B:
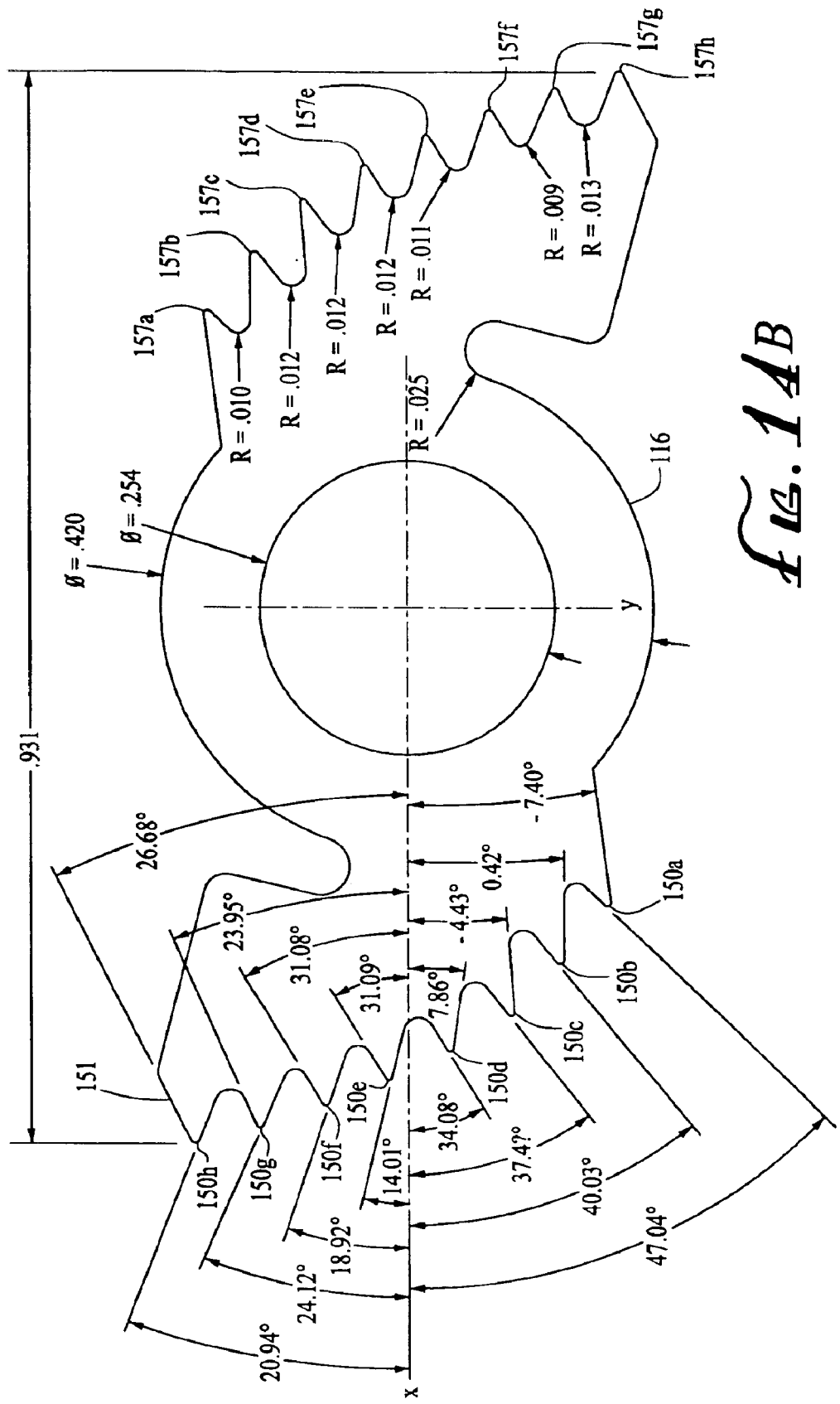

As seen in FIGS. 14a and 14b, each plurality of teeth on cam 116 preferably comprises eight teeth. Six of the eight teeth in each plurality of teeth preferably lie on a common curvilinear surface configured to trace segments of constant radius arc defined by the opposed end surfaces 151 and 153 of the cam. In the first plurality of line engagement teeth, teeth 150c–150h lie on the common constant radius arc that is defined by end surface 151 and traced about a point or axis "+" located radially inwardly of the central axis of the adjacent pivot post 136 and laterally from the axis of the post in a direction away from the adjacent line support wall 132. The seventh tooth 150b is spaced radially inwardly from that arc a distance "d" and the eighth or outermost tooth 150a is inwardly spaced toward point "+" a distance that is preferably about twice distance d. By way of example, with a cam 116 having an overall length of 0.931 in. and oriented on an X-Y axis as shown in FIG. 14A, the arc defined by the tips of teeth 150c–150h has a constant radius of 0.885 in. from point + that is displaced +0.399 in. along the X axis and −0.373 in. along the Y axis from the central axis of the pivot post 136 which, of course, is coincident with the central axis of the cam (see FIG. 14A). Tooth 150b is radially spaced inwardly a distance of 0.015 in. from a continuation of said arc and the outermost tooth 150a is inwardly spaced a distance of 0.030 in. therefrom. The tip of tooth 150a is spaced about 0.026–0.029 in. from the inner surface of shim 100 and, as noted earlier, the central axis of mounting post 136 is spaced 0.414 in. from the inner surface of shim 100. The location for the point or axis + defining the constant radius arc on which teeth 157c–157h is disposed is diametrically across the central axis of the cam as is also shown in FIG. 14A. It should be noted that when mounted on posts 136 in housing 112, each of the cams 116 is pivoted by a torsion spring 118 in a counterclockwise direction to a static position wherein an outer surface of the cam abuts a stop 160. The outer end surface 139' of spring retention wall 139 is positioned to form a second stop against which an inner surface of the cam is pressed, as seen in FIG. 12B. This is also the case in the prior embodiments as illustrated in FIG. 2. It is important to note, however, that in the static position, cam 116 is not positioned on the X axis as shown in FIGS. 14A and 14B, but is rotated clockwise about 15° about its central axis as seen in FIG. 12B. Such a configuration allows the cam 116 to continually place at least three and generally four teeth against the cutting line to provide excellent securement of the line in the head during use regardless of whether the size of the line being used in the head has a diameter of 0.080 in., 0.155 in. or any diameter therebetween.

The particular angular orientations of the individual teeth on cam 116 are illustrated in detail in FIG. 14B. In that regard it should be noted, that the pointed line engagement teeth in the first embodiment of cam 16 are uniformly spaced along the end surface of the cam and are oriented such that all of the teeth projecting into the adjacent channel 44 project at increasing angles of inclination with respect to the support wall, from the outermost tooth 50a to the innermost blunt tooth 53. In cam 116, the teeth are relatively uniformly spaced apart, however, tooth 150c, while inwardly inclined with respect to the wear resistant surface of support wall 132 is not as inclined with respect to that surface as its outwardly adjacent tooth 150b. Such a configuration has been found to provide excellent line engaging characteristics. In addition, the innermost tooth 150h, which is pointed and not blunt like the innermost tooth on cam 16, is not as inclined with respect to the support wall surface as its inwardly adjacent tooth 150g. This configuration provides a better securement of the small diameter 0.800 in. line. Otherwise, the angles of inclination of the line engaging teeth in cam 116 do increase from the outer tooth to the inner as in the prior embodiment of the cam. Accordingly, the teeth are described herein as "generally projecting" from the outermost tooth to the innermost tooth into the adjacent channel at increasing angles of inclination. The configuration and inclination of the second plurality of teeth, 157a–157h, of course, would be the same as teeth 150a–150h if the cam were rotated about its mounting post as earlier described. The result of such a cam configuration provides excellent securement of a wide range of line sizes while still allowing the line to be pulled through the head for replacement as earlier described.

It has been found that when manufacturing techniques prevent the cam engagement teeth from having a sufficiently sharp edge, it may be desirable to provide the wear resistant surface of the channel support walls with a higher coefficient of friction to better enable the teeth to initially snag the line. Otherwise, at start-up, the cutting line may engage a solid object and be pulled from the head before the cam can snag and secure the line in place. It is preferred that the points or edges of the individual teeth in cam 116 define a radius of about 0.003 in. However, with certain manufacturing processes such tight radii are difficult or impossible to achieve. When the teeth define a radius of only about 0.006–0.009 in., it has been found desirable to provide the wear resistant metal surface of the channel walls with some form of knurling or raised points or ridges to inhibit the withdrawal of the line from channels 144. This is easily achieved with stainless steel shims 100 by providing knurling 100a on the inner surface 100' thereof as shown in FIG. 12C or by using ramped ridges 100" on surface 100a as shown in FIGS. 12D and 12E. Note that when such ramped ridges are employed, they are angled inwardly of the housing at an angle of about 30°, are about 0.050 in. in length and are about 0.010 in. deep. The resulting wall surface enables the duller cam teeth to more quickly snag the line and prevent the line from being pulled from the head during start up.

Figure 15:
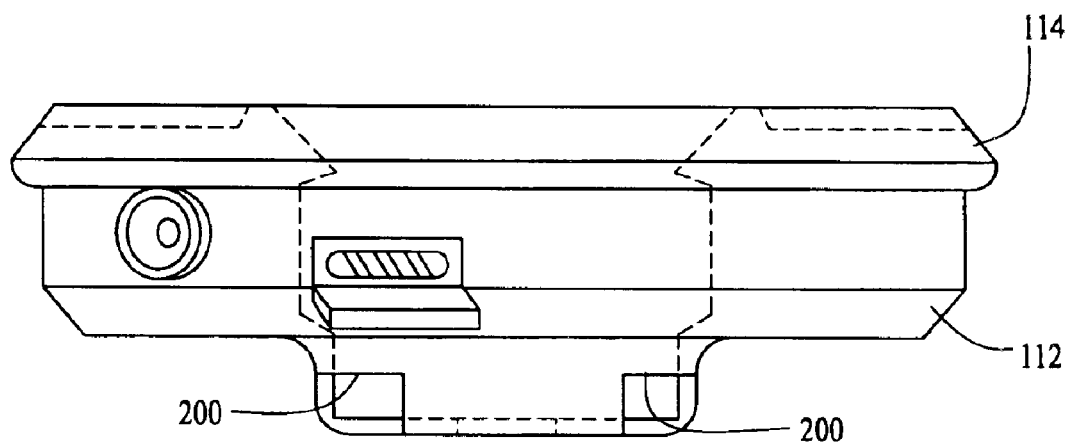
FIG. 15 is a side view of the embodiment of the cutting head housing illustrated in FIG. 12 showing the vent apertures formed therein.

In the addition to the stainless steel shims 100 and the newly configured cams 116, the preferred embodiment of the head 110 retains the cam stabilizing walls 75a and 75b of the second embodiment (numbered 175a and 175b in FIG. 13) and additionally includes vent apertures 200 in the upper portion of the housing as seen in FIG. 15. It has been found that during use, a vacuum is created adjacent the bottom cover of the head which makes uniform cutting more difficult. It is believed that this results from the large central opening 164 in the cover. By providing spaced vent apertures 200 in the upper portion of the housing 112, the creation of such a vacuum is prevented.

Various changes and modifications also may be made in carrying out the present invention without departing from the spirit and scope thereof. Insofar as these changes and modifications are within the purview of the appended claims, they are to be considered as part of the present invention.

We claim:

1. A cutting head for rotary trimmers using at least one fixed length of flexible line as a cutting implement comprising:

a housing defining an annular wall portion, a perimeter wall portion axially spaced from said annular wall portion and having at least one opening therein, a line support wall adjacent each said opening and extending inwardly therefrom, at least a portion of said wall having a wear resistant surface, a channel extending radially inwardly from each said opening along said support wall for receiving a length of flexible line therein, a post adjacent each said channel proximate said opening in said perimeter wall portion of said housing;

a line engagement cam mounted on each said post for pivotal movement about a central axis of said post, each cam being configured so as to be symmetrical about said central axis and defining a plurality of line engaging pointed teeth spaced along an end surface of the cam from an outermost tooth to an innermost tooth such that said teeth generally project from said outermost tooth to said innermost tooth into each said channel at increasing angles of inclination with respect to the wear resistant surface of said support wall and at decreasing distances from said surface; and a spring member operatively connected with each said cam for urging said curvilinear surface on said cam in a first direction toward said opening.

2. The cutting head of claim 1 including at least one stop for limiting pivotal movement of each said cam in said first direction.

3. The cutting head of claim 1 wherein said wear resistant surface is formed of metal.

4. The cutting head of claim 1 wherein said wear resistant surface is formed of stainless steel.

5. The cutting head of claim 1 including a cover adapted to mate with and be releasably secured to said housing, said cover defining a radially extending projection extending along and across said channel upon said cover being secured to said housing so as to form a bottom wall for said channel to retain a length of cutting line within each said channel as said line is inserted through said channel.

6. The cutting head of claim 1 including a cover adapted to mate with and be releasably secured to said housing, said cover including a plurality of arcuate projections disposed outwardly of said post and adjacent said cam upon said cover being secured to said housing whereby said cam is maintained in a horizontal disposition within said housing.

7. The cutting head of claim 1 wherein at least a substantial portion of said end surface of each cam is curvilinear and configured to trace a segment of a constant radius arc about a fixed point located inwardly of and laterally from the central axis of said post and at least a majority of said plurality of teeth are disposed along said curvilinear portion of said end surface.

8. The cutting head of claim 1 wherein at least a substantial portion of said end surface of each cam is curvilinear and configured to trace a segment of a constant radius arc about a fixed point located inwardly of and laterally from the central axis of said post, a majority of said plurality of teeth are disposed along said curvilinear portion of said end surface and a minority of said teeth are disposed outwardly on said end surface of said cam from said curvilinear position thereof and a shorter radial distance from said fixed point than said majority of teeth disposed on said curvilinear portion of said end surface.

9. The cutting head of claim 5 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

10. The cutting head of claim 5 wherein said housing defines an interior circular wall portion inwardly spaced from said perimeter wall portion, said interior wall portion circumscribing a central area and defining at least one opening therein, each said opening being radially aligned with each said channel in said housing for communicating said channel with said central area and wherein said cover includes a central opening therein axially aligned with said central area in said housing upon said cover being secured to said housing for providing external access to said central area whereby a length of flexible line inserted through each said channel into said central area can be grasped in said central area and pulled inwardly through said channel and from said head to effect removal of worn and broken line.

11. The cutting head of claim 5 wherein said cover additionally includes a plurality of arcuate projections, said arcuate projections being disposed outwardly of said post and adjacent said cam upon said cover being secured to said housing whereby said cam is maintained in a horizontal disposition within said housing.

12. The cutting head of claim 6 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

13. The cutting head of claim 7 including at least one stop for limiting pivotal movement of said cam in said first direction.

14. The cutting head of claim 7 wherein said wear resistant surface is formed of metal.

15. The cutting head of claim 7 wherein said wear resistant surface is formed of stainless steel.

16. The cutting head of claim 8 wherein said minority of said teeth comprises two teeth including said outermost tooth and wherein said outermost tooth is disposed a shorter radial distance from said fixed point than the other tooth in said minority teeth.

17. The cutting head of claim 10 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

18. A cutting head for rotary trimmers using at least one fixed length of flexible line as a cutting implement comprising:

a housing defining an annular wall portion, a perimeter wall portion axially spaced from said annular wall portion and having at least one opening therein, a line support wall adjacent each said opening and extending inwardly therefrom, at least a portion of said wall having a wear resistant surface, a channel extending radially inwardly from each said opening along a support wall for receiving a length of flexible line therein, and a post adjacent each said channel proximate each said opening in said perimeter wall portion of said housing;

a line engagement cam mounted on each said post for pivotal movement about a central axis of said post, each cam being configured so as to be symmetrical about said central axis and defining a plurality of line engaging pointed teeth spaced along an end surface of the cam from an outermost tooth to an innermost tooth, at least a portion of said end surface being curvilinear and configured to trace a segment of a constant radius about a fixed point located inwardly of and laterally from the central axis of said post, at least a majority of said line engaging teeth being disposed along said curvilinear portion of said end surface whereby line engaging teeth generally project into each said channel at increasing angles of inclination with respect to the wear resistant surface of the support wall extending along the channel and at decreasing distances from said surface; and a spring member operatively connected with each said cam for pivoting said cam in said first direction.

19. The cutting head of claim 18 including at least one stop for limiting pivotal movement of each said cam in said first direction.

20. The cutting head of claim 18 wherein said wear resistant surface is formed of metal.

21. The cutting head of claim 18 including a cover adapted to mate with and be releasably secured to said housing, said cover defining a radially extending projection extending along and across said channel upon said cover being secured to said housing so as to form a bottom wall for each said channel to retain a length of cutting line within each said channel as said line is inserted through said channel.

22. The cutting head of claim 18 including a cover adapted to mate with and be releasably secured to said housing, said cover including a plurality of arcuate projections disposed outwardly of said post and adjacent said cam upon said cover being secured to said housing whereby said cam is maintained in a horizontal disposition within said housing.

23. The cutting head of claim 18 wherein a minority of said line engaging teeth spaced along said end surface of said cam are disposed outwardly along said surface from said curvilinear portion thereof and a shorter radial distance from said fixed point than said majority of teeth disposed on said curvilinear portion of said end surface.

24. The cutting head of claim 18 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

25. A cutting head of claim 21 wherein said housing defines an interior circular wall portion inwardly spaced from said perimeter wall portion, said interior wall portion circumscribing a central area and defining an opening therein, each said opening being radially aligned with each said channel in said housing for communicating said channel with said central area and wherein said cover includes a central opening therein axially aligned with said central area in said housing upon said cover being secured to said housing for providing external access to said central area whereby a length of flexible line inserted through each said channel into said central area can be grasped in said central area and pulled inwardly through the channel and from said head to effect removal of worn and broken line.

26. The cutting head of claim 21 wherein said cover additionally includes a plurality of arcuate projections, said arcuate projections being disposed outwardly of said post and adjacent said cam upon said cover being secured to said housing whereby said cam is maintained in a horizontal disposition within said housing.

27. The cutting head of claim 23 wherein said minority of said teeth comprises two teeth including said outermost tooth and wherein said outermost tooth is disposed a shorter radial distance from said fixed point than the other tooth in said minority teeth.

28. The cutting head of claim 25 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

29. A cutting head for rotary trimmers using at least one fixed length of flexible line as a cutting implement comprising:

a housing defining an annular wall portion, a perimeter wall portion axially spaced from said annular wall portion and having at least one opening therein, a line support wall adjacent each said opening and extending inwardly therefrom, at least a portion of said wall having a wear resistant surface, a channel extending radially inwardly from each said opening along a support wall for receiving a length of flexible line therein, and a post adjacent each said channel proximate each said opening in said perimeter wall portion of said housing;

a line engagement cam mounted on each said post for pivotal movement about a central axis of said post, each cam being configured so as to be symmetrical about said central axis and defining a pair of opposed end surfaces and first and second pluralities of line engaging pointed teeth, one of said pluralities of teeth being spaced along each end surface from an outermost tooth to an innermost tooth such that one of said pluralities of teeth on each said cam generally projects into each said channel at increasing angles of inclination with respect to the wear resistant surface of the support wall extending along the channel and at decreasing distances from said surface such that upon inserting a length of flexible line through said opening and along said channel and pivoting said cam about said post in a first direction toward said opening, at least three of said teeth projecting into said channel will engage said line and prevent retraction of said line from said head; and a spring member operatively connected with each said cam for pivoting said cam in said first direction.

30. The cutting head of claim 29 including at least one stop for limiting pivotal movement of each said cam in said first direction.

31. The cutting head of claim 29 wherein said wear resistant surface is formed of metal.

32. The cutting head of claim 29 wherein the opposed end surfaces on each said cam are disposed on opposed sides of the central axis of the post on which the cam is mounted and are spaced equal distances from said axis and wherein each of the cams is configured so as to be reversably mounted on said post whereby upon one or more of the teeth in the plurality of teeth projecting into said channel becoming worn or damaged, said cam can be removed from said post, rotated 180° with respect to said post and re-mounted thereon whereupon the other plurality of teeth generally projects from an outermost tooth to an innermost tooth into said channel in said increasing angles of inclination with respect to said wear resistant surface and at said decreasing distances therefrom.

33. The cutting head of claim 29 wherein said housing further includes one or more air vents in an upper portion thereof communicating with said central opening in said cover upon said cover being secured to said housing so as to allow air flow through said housing to said cover to prevent the creation of a low pressure area adjacent said opening in said cover during rotation of said cutting head.

34. The cutting head of claim 29 including a cover adapted to mate with and be releasably secured to said housing, said cover defining a radially extending projection extending along and across said channel upon said cover being secured to said housing so as to form a bottom wall for said channel to retain a length of cutting line within each said channel as said line is inserted through said channel.

35. The cutting head of claim 29 including a cover adapted to mate with and be releasably secured to said housing, said cover including a plurality of arcuate projections disposed outwardly of said post and adjacent said cam upon said cover being secured to said housing whereby said cam is maintained in a horizontal disposition within said housing.

36. The cutting head of claim 34 wherein said housing defines an interior circular wall portion inwardly spaced from said perimeter wall portion, said interior wall portion circumscribing a central area and defining at least one opening therein, each said opening being radially aligned with each said channel in said housing for communicating said channel with said central area and wherein said cover includes a central opening therein axially aligned with said central area in said housing upon said cover being secured to said housing for providing external access to said central area whereby a length of flexible line inserted through each said channel into said central area can be grasped in said central area and pulled inwardly through said channel and from said head to effect removal of worn and broken line.

37. The cutting head of claim 34 wherein said cover additionally includes a plurality of arcuate projections, said arcuate projections being disposed outwardly of said post and adjacent said cam upon said cover being secured to said housing whereby said cam is maintained in a horizontal disposition within said housing.

38. A cutting head for rotary trimmers using at lest one fixed length of flexible line as a cutting implement comprising:
    a housing defining an annular wall portion, a perimeter wall portion axially spaced from said annular wall portion and having at least one opening therein, a line support wall adjacent each said opening and extending inwardly therefrom, at least a portion of said wall having a wear resistant surface, a channel extending radially inwardly from each said opening along a support wall for receiving a length of flexible line therein, and a post adjacent each said channel proximate each said opening in said perimeter wall portion of said housing;
    a line engagement cam mounted on each said post for pivotal movement about a central axis of said post, each cam being configured so as to be symmetrical about said central axis and defining a pair of opposed end surfaces and first and second pluralities of line engaging pointed teeth, one of said pluralities of teeth being spaced along each end surface from an outermost tooth to an innermost tooth, at least a portion of each end surface being curvilinear and configured to trace a segment of a constant radius about a fixed point, one of said points being located inwardly of and laterally from the central axis of said post, the other of said points being located outwardly of and laterally from said central axis of said post, said fixed points being spaced diametrically across said central axis of said post and wherein at least a majority of the line engaging teeth in each plurality of teeth is disposed along a curvilinear portion of one of said end surfaces such that line engaging teeth on one of said surfaces generally project into each said channel at increasing angles of inclination with respect to the wear resistant surface of the support wall extending along the channel and at decreasing distances from said surface; and
    a spring member operatively connected with each said cam for pivoting said cam in a first direction.

39. The cutting head of claim 38 including at least one stop for limiting pivotal movement of each said cam in said first direction.

40. The cutting head of claim 38 wherein said wear resistant surface is formed of metal.

41. The cutting head of claim 38 wherein a minority of said teeth in each of said pluralities thereof are disposed a shorter radial distance from one of said fixed points than the majority of said teeth on said end surface.

42. The cutting head of claim 1 wherein said wear resistant surface is irregular so as to provide said surface with an increased coefficient of friction inhibiting inadvertent withdrawal of the line from said channel.

43. The cutting head of claim 3 wherein said wear resistant surface defines a plurality of raised ridges thereon for inhibiting inadvertent withdrawal of the line from said channel.

44. The cutting head of claim 3 wherein said wear resistant surface defines knurling thereon so as to provide said surface with an increased coefficient of friction inhibiting inadvertent withdrawal of the line from said channel.

45. The cutting head of claim 18 wherein said wear resistant surface is irregular so as to provide said surface with an increased coefficient of friction inhibiting inadvertent withdrawal of the line from said channel.

46. The cutting head of claim 20 wherein said wear resistant surface defines a plurality of raised ridges thereon for inhibiting inadvertent withdrawal of the line from said channel.

47. The cutting head of claim 20 wherein said wear resistant surface defines knurling thereon so as to provide said surface with an increased coefficient of friction inhibiting inadvertent withdrawal of the line from said channel.

48. The cutting head of claim 29 wherein said wear resistant surface is irregular so as to provide said surface with an increased coefficient of friction inhibiting inadvertent withdrawal of the line from said channel.

49. The cutting head of claim 31 wherein said wear resistant surface defines a plurality of raised ridges thereon for inhibiting inadvertent withdrawal of the line from said channel.

50. The cutting head of claim 31 wherein said wear resistant surface defines knurling thereon so as to provide said surface with an increased coefficient of friction inhibiting inadvertent withdrawal of the line from said channel.

51. The cutting head of claim 38 wherein said wear resistant surface is irregular so as to provide said surface with an increased coefficient of friction inhibiting inadvertent withdrawal of the line from said channel.

52. The cutting head of claim 40 wherein said wear resistant surface defines a plurality of raised ridges thereon for inhibiting inadvertent withdrawal of the line from said channel.

53. The cutting head of claim 40 wherein said wear resistant surface defines knurling thereon so as to provide said surface with an increased coefficient of friction inhibiting inadvertent withdrawal of the line from said channel.

54. A cutting head for rotary trimmers using at least one fixed length of flexible line as a cutting implement comprising:

a housing defining an annular wall portion, a perimeter wall portion axially spaced from said annular wall portion and having at least one opening therein, a line support wall adjacent each said opening and extending inwardly therefrom, a channel extending radially inwardly from each said opening along said support wall for receiving a length of flexible line therein, at least a portion of said wall having an irregular wear resistant surface;

a line engagement cam pivotally mounted about an axis on said housing proximate each said chaanel therein, each said cam being configured so as to be symmetrical about said axis and defining a plurality of line engaging pointed teeth spaced along an end surface of the cam from an outermost tooth to an innermost tooth such that said teeth generally project from said outermost tooth to said innermost tooth into each said channel at increasing angles of inclination with respect to the wear resistant surface of said support wall and at decreasing distances from said surface; and a spring member operatively connected with each said cam for urging said curvilinear surface on said cam in a first direction toward said opening.

55. The cutting head of claim 54 including at least one stop for limiting pivotal movement of each said cam in said first direction.

56. The cutting head of claim 54 wherein said wear resistant surface is irregular so as to provide said surface with an increased coefficient of friction inhibiting inadvertent withdrawal of the line from said channel.

57. The cutting head of claim 54 wherein said wear resistant surface is formed of metal.

58. The cutting head of claim 57 wherein said wear resistant surface defines a plurality of raised ridges thereon for inhibiting inadvertent withdrawal of the line from said channel.

59. The cutting head of claim 57 wherein said wear resistant surface defines knurling thereon so as to provide said surface with an increased coefficient of friction inhibiting inadvertent withdrawal of the line from said channel.

* * * * *